United States Patent
Sreedhar et al.

(10) Patent No.: US 10,681,031 B2
(45) Date of Patent: Jun. 9, 2020

(54) FEDERATING DEVICES TO IMPROVE USER EXPERIENCE WITH ADAPTIVE SECURITY

(71) Applicant: International Business Machines Corporation, Armonk, NY (US)

(72) Inventors: Pranam C. Sreedhar, Singapore (SG); Patrick R. Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/930,010

(22) Filed: Nov. 2, 2015

(65) Prior Publication Data
US 2017/0126662 A1 May 4, 2017

(51) Int. Cl.
G06F 7/04 (2006.01)
H04L 29/06 (2006.01)
G06F 15/16 (2006.01)

(52) U.S. Cl.
CPC ........ H04L 63/0815 (2013.01); H04L 63/104 (2013.01); H04L 63/107 (2013.01); *H04L 2463/082* (2013.01)

(58) Field of Classification Search
CPC ......... G06F 21/35; G06F 21/36; H04L 63/08; H04L 63/0853; H04L 63/10; H04L 63/102; H04L 63/18; H04L 65/60; H04L 9/321
USPC ........................................ 726/8, 9; 713/168
See application file for complete search history.

(56) References Cited

U.S. PATENT DOCUMENTS

| | | | |
|---|---|---|---|
| 6,877,094 B1 * | 4/2005 | DiGiorgio | G06Q 20/04 713/176 |
| 8,424,026 B1 * | 4/2013 | Cottrell | H04L 67/16 709/245 |
| 8,522,039 B2 | 8/2013 | Hyndman et al. | |
| 8,572,391 B2 | 10/2013 | Golan et al. | |
| 8,627,438 B1 * | 1/2014 | Bhimanaik | H04L 63/10 726/9 |
| 9,210,125 B1 * | 12/2015 | Nichols | H04L 61/6081 |
| 9,460,271 B2 * | 10/2016 | Baks | G06F 21/10 |
| 2003/0046589 A1 * | 3/2003 | Gregg | G06F 21/335 726/5 |

(Continued)

OTHER PUBLICATIONS

Bocek, Kevin, InformationWeek, The Internet of Things: It's All About Trust http://www.informationweek.com/security/identity-and-access-management/the-problem-with-two-factor-authentication/d/d-id/1113697, printed Oct. 19, 2015.

*Primary Examiner* — Gary S Gracia
(74) *Attorney, Agent, or Firm* — Terrile, Cannatti & Chambers, LLP; Stephen A. Terrile (57) ABSTRACT

A method, system and computer-usable medium for performing an adaptive security operation comprising: performing an authentication operation via a first device, the authentication operation analyzing an obligation performed by a first user; establishing access to a protected resource by the first device based upon the obligation performed by the first user; generating an attribute list comprising at least one attribute of the first device; analyzing a second device to determine whether the second device comprises an attribute corresponding to the at least one attribute of the first device; and, allowing access to the protected resource by the second device when the second device comprises the attribute corresponding to the at least one attribute of the first device.

20 Claims, 5 Drawing Sheets

(56) References Cited

U.S. PATENT DOCUMENTS

| | | | |
|---|---|---|---|
| 2008/0046984 A1* | 2/2008 | Bohmer | H04L 63/0853 726/5 |
| 2008/0109867 A1* | 5/2008 | Panabaker | H04W 12/08 726/1 |
| 2008/0120401 A1* | 5/2008 | Panabaker | H04L 63/104 709/223 |
| 2008/0209213 A1* | 8/2008 | Astrand | H04L 63/083 713/168 |
| 2010/0024017 A1* | 1/2010 | Ashfield | G06F 21/35 726/7 |
| 2011/0035443 A1 | 2/2011 | Jensen | |
| 2011/0321119 A1* | 12/2011 | Kotani | G06F 21/606 726/1 |
| 2012/0210413 A1* | 8/2012 | Akula | H04L 63/0815 726/8 |
| 2012/0284779 A1 | 11/2012 | Ingrassia, Jr. et al. | |
| 2012/0323686 A1* | 12/2012 | Burger | G06F 21/316 705/14.55 |
| 2013/0085800 A1 | 4/2013 | Radkowski et al. | |
| 2013/0104218 A1* | 4/2013 | Lu | H04L 9/3273 726/7 |
| 2013/0179692 A1* | 7/2013 | Tolba | H04L 63/08 713/179 |
| 2013/0227712 A1 | 8/2013 | Salem et al. | |
| 2014/0109234 A1* | 4/2014 | Lin | G06F 21/10 726/27 |
| 2014/0180850 A1 | 6/2014 | Ackley | |
| 2014/0245396 A1* | 8/2014 | Oberheide | H04L 63/08 726/4 |
| 2014/0351899 A1* | 11/2014 | Dennis | H04W 12/06 726/4 |
| 2014/0359735 A1* | 12/2014 | Lehmann | H04L 63/0884 726/7 |
| 2015/0019873 A1* | 1/2015 | Hagemann | H04W 12/06 713/186 |
| 2015/0033017 A1* | 1/2015 | Uliyar | H04L 9/3231 713/171 |
| 2015/0046969 A1* | 2/2015 | Abuelsaad | G06F 21/41 726/1 |
| 2015/0074763 A1* | 3/2015 | Schwartz | H04L 63/107 726/4 |
| 2015/0327060 A1* | 11/2015 | Gilson | H04W 76/10 726/7 |
| 2016/0125490 A1* | 5/2016 | Angal | G06Q 30/0609 705/26.35 |

* cited by examiner

FEDERATING DEVICES TO IMPROVE USER EXPERIENCE WITH ADAPTIVE SECURITY

BACKGROUND OF THE INVENTION

Field of the Invention

The present invention relates in general to the field of computers and similar technologies, and in particular to software utilized in this field. Still more particularly, it relates to a method, system and computer-usable medium for federating devices to improve user experience with adaptive security.

Description of the Related Art

In an information technology (IT) environment within an enterprise, users often access applications from devices provisioned to them by their IT departments. With the advent of bring your own device (BYOD), users obtain their personal devices and access these enterprise applications from their personal devices. It is known to provide IT environments with mobile device management and risk based access systems to prevent malicious users from accessing these applications. Many known risk based systems are designed based on single user single device usage patterns. Also, known second factor authentication mechanisms prevent malicious users from accessing these applications.

As the number of BYOD users increase, application infrastructures will need to cater to multiple devices including an ever increasing use case of where multiple devices are owned by a single user. Second factor for each user and each device can prove costly to maintain and administer. Additionally, usability and ease of use is another concern for the users.

SUMMARY OF THE INVENTION

A method, system and computer-usable medium are disclosed for performing an adaptive security operation comprising: performing an authentication operation via a first device, the authentication operation analyzing an obligation performed by a first user; establishing access to a protected resource by the first device based upon the obligation performed by the first user; generating an attribute list comprising at least one attribute of the first device; analyzing a second device to determine whether the second device comprises an attribute corresponding to the at least one attribute of the first device; and, allowing access to the protected resource by the second device when the second device comprises the attribute corresponding to the at least one attribute of the first device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for performing an adaptive security operation in a multiple device environment. In various embodiments, the adaptive security operation provides federation of devices based on device attributes. For the purposes of this disclosure federation of devices may be defined as a group of devices that share a common set of attributes and are linked to become part of a federation via a dynamic policy.

In various embodiments, the adaptive security operation triggers second factor authentication only on a subset of devices based on a dynamic risk policy, thus providing a better user experience. This adaptive security operation is performed via an adaptive security system which calculates risk scores based on multiple devices belonging to a user or multiple devices in a federation using a set of common device attributes. In various embodiments, the adaptive security system includes a policy which understands the multiple device context, applies a risk score based upon the multiple device context and determines whether the second factor authentication should be triggered.

Such an adaptive security operation advantageously provides risk calculation based on multiple devices considering the system in a wider context, creates a federation of devices based upon device attributes, thus helping to identify similar devices from a usage perspective and provides dynamic risk policy rules that can trigger selected second factor authentication, thus resulting in a better user experience.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
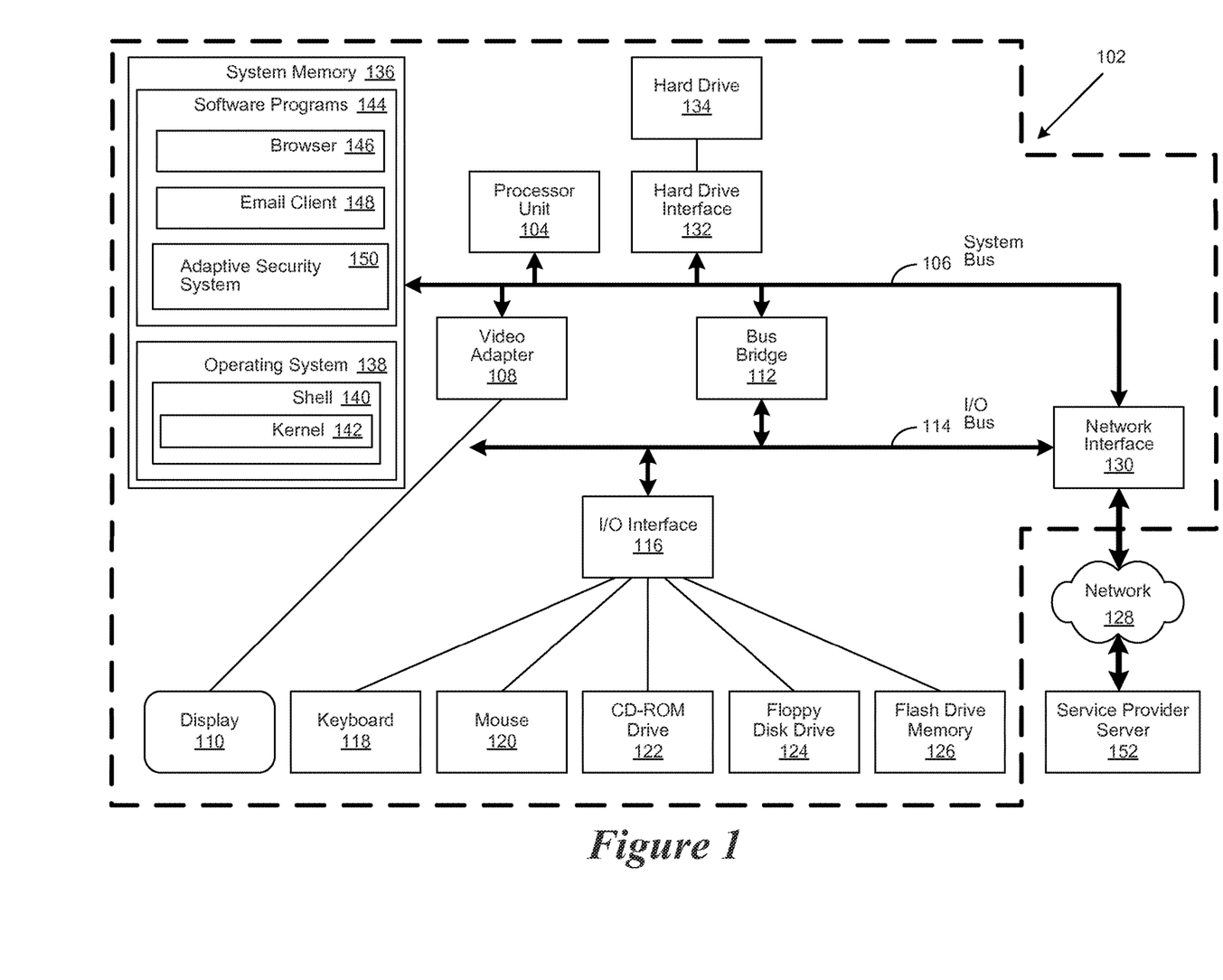
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include an adaptive security system 150. In these and other embodiments, the adaptive security system 150 includes code for implementing the processes described hereinbelow. In one embodiment, client computer 102 is able to download the adaptive security system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
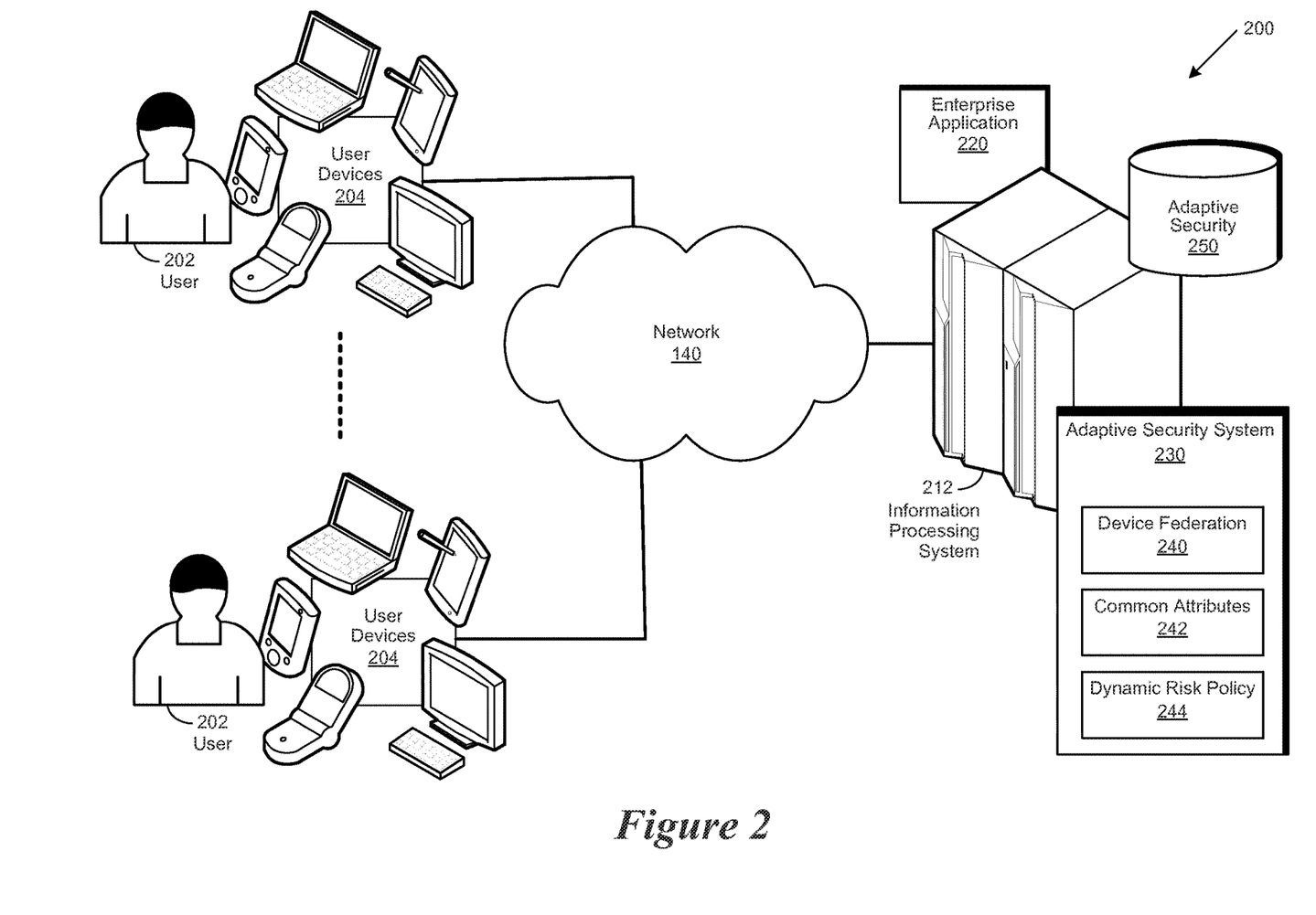
FIG. 2 shows a block diagram of an adaptive security environment.

FIG. 2 shows a block diagram of an adaptive security environment 200. The adaptive security environment 200 demonstrates performing an adaptive security operation in a multiple device environment. In various embodiments, the adaptive security operation provides federation of devices based on device attributes. In various embodiments, the adaptive security operation triggers second factor authentication only on a subset of devices based on a dynamic risk policy, thus providing a better user experience. This adaptive security operation is performed via an adaptive security system which calculates risk scores based on multiple devices belonging to a user or multiple devices in a federation using a set of common device attributes. In various embodiments, the adaptive security system includes a policy which understands the multiple device context, applies a risk score based upon the multiple device context and determines whether the second factor authentication should be triggered.

FIG. 2 is a simplified block diagram of an adaptive security environment 200 implemented in accordance with an embodiment of the invention. In various embodiments, a plurality of users 202 each have access to one or more user devices 204. As used herein, a user device 204 refers to a device which is associated with the user. In various embodiments, the user device 204 can also include an information processing system such as a personal computer, a laptop computer, a tablet computer, a personal digital assistant (PDA), a smart phone, a mobile telephone, or other device that is capable of communicating and processing data such as a smart watch type device. In various embodiments, the user device 204 can also include passive devices such as a user badge. In various embodiments, a plurality of user devices 204 are used to perform an adaptive security operation associated with the user 202.

In various embodiments, the user device 204 is used to exchange information between the user 202 and an information processing system 212 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the information processing system 212 is executing an enterprise application 220 which may be accessed by one or more user devices 204. Also, in certain embodiments, the environment 200 further includes an adaptive security system 230. The adaptive security system 230 interacts with a plurality of user devices 204. In various embodiments, the adaptive security system 230 includes a device federation module 240, a common attributes for federation module 242, and a dynamic risk policy for federation module 244. In various embodiments, some or all of the adaptive security information is stored within an adaptive security repository 250.

The device federation module 240 enables the adaptive security system 230 to perform a device federation operation. With the device federation operation, a single user with multiple devices or a set of users having a single or multiple devices each can be considered as a federation. The federation enables the adaptive security operation to create a preconfigured administrator policy for devices within the federation. For example, in certain embodiments, the federation operation can categorize devices provided to users within a particular organization (e.g., a department or business unit) as part of a particular federation.

The common attributes module 242 enables the adaptive security system 230 configure and/or identify common attributes for a federation. More specifically, the federation operation compiles a list of attributes collected for each device to provide a list of common attributes. This list of attributes is stored via the common attributes module 242. The common set of attributes are evaluated by the risk policy. In certain cases, an IP subnet address and a geographic location are examples of attributes that are included within the list of attributes that can be used to decide a need for obligation. The list of common attributes can be extended to include additional attributes. Additionally, a common set of attributes per federation can be configured by the device federation module 240 interacting with the common attributed module 242. In operation, a federation is identified a valid only if the common attributes have the same value across device.

In various embodiments, the common attributes list can be extended dynamically. When dynamically extending the common attributes list, devices supply additional attributes during registration of the devices and access to the protected resource (e.g., the enterprise application 220). If the values of one or more additional attributes are the same across devices, then these attributes can be added to the common attributes list. Examples of additional attributes include a version of a browser, a version of an operating system, plugins associated with the browser, etc. For example, a particular IP subnet address and/or particular geographic location are initially used as the common attributes for a particular federation. Over time, the adaptive security system 230 identifies a pattern where the devices have the same identified Bluetooth type devices in proximity with the user devices 204. A risk engine within the adaptive security system 230 captures the Bluetooth information. This Bluetooth information is then added to the common attribute list in addition of the particular IP subnet address and particular geographic location. Similarly, when certain devices no longer have a common pattern, the corresponding attribute can be removed from the common attributes list. In various embodiments, the information about the attributes is used by the dynamic policy module 244.

The dynamic risk policy module 244 enables the adaptive security system 230 to perform a dynamic risk policy operation. The policy of the federation determines which and how many users and/or device in the federation need to complete an obligation before other devices in the federation will be adaptively authorized. The dynamic risk policy operation uses the attributes that are common for the federation and the rules provide flexible options. For example, with certain policies all users need to complete an obligation successfully for each device of their associated devices. With other policies a predetermined set of users need to complete an obligation successfully for a subset of their associated devices. With other policies, a single user needs to complete the obligation successfully for a particular device.

If the rules of the policy are satisfied, then any other users within the federation need to participate in the obligation process. In various embodiments, the rules may be user or device specific. E.g., a certain user or a certain device must complete the obligation for the remainder of the federation to be authorized. In various embodiments, a combination of rules must be completed for the remainder of the federation to be authorized. E.g., a first user must complete the obligation for all associated devices and a certain number of other users must complete the obligation for one of their associated devices.

When performing an adaptive security operation with a single user device 204, a user 202 attempts to access an enterprise application 220 which displays confidential information, which for example is executing on the information processing system 100. The user device 204 is registered when they attempt to access the enterprise application 220. One or more device attributes such as an internet protocol (IP) subnet address, operating system, geographic location, etc. are registered with the adaptive security system 230. If the user 202 attempts to access the enterprise application 220 is from a different location, the IP subnet address and the geographic location might change. Either of these changes would cause the adaptive security system 230 to trigger an obligation. In accordance with the present disclosure, this obligation is considered a second factor authentication. After the user 202 provides an acceptable second factor authentication, the user is provided with access to the enterprise application. Examples of acceptable second factor authentication include one or more of an open authentication (OATH) based keyed-hash message authentication code (HMAC) based one-time password (HOTP) or time-based one-time password (TOTP), short message service (SMS) coded authentication, email coded authentication, Rivest Shamir Adleman (RSA) type authentication and/or biometric authentication.

When performing an adaptive security operation with a plurality of devices per user 202, a user attempts to access the enterprise application 220 from a plurality of the devices 204 over a certain period of time. As each device 204 accesses the enterprise application 220, the respective device 204 is registered with the adaptive security system 230. If the user 202 attempts to access the enterprise application 220 from a different location, the user is prompted for an acceptable second factor authentication. Even if the new geographic location and IP subnet is common across all the devices, the user 202 completes the second factor authentication process. However, the adaptive security operation minimizes the overhead associated with the second factor authentication process as the adaptive security system associates all of the registered user devices with the user at the new location.

When performing an adaptive security operation for a plurality of users each having a plurality of devices, each device for each user is registered by the adaptive security system 230. If some or all of the plurality of users now attempt to access the enterprise application 220 from a different location that is common to the some or all of the plurality of users (e.g., a conference location attended by some of the plurality of users), a second factor authentication process is required for the first user 202 to access the enterprise application 220. However, the second factor authentication process can be minimized as the adaptive security system 230 categorizes all of the plurality of devices from the plurality of users in a single entity. The adaptive security system 230 creates a rule such that once a subset of the plurality of users complete the second factor authentication, the rest of the users need not go through the same process.

Figure 3:
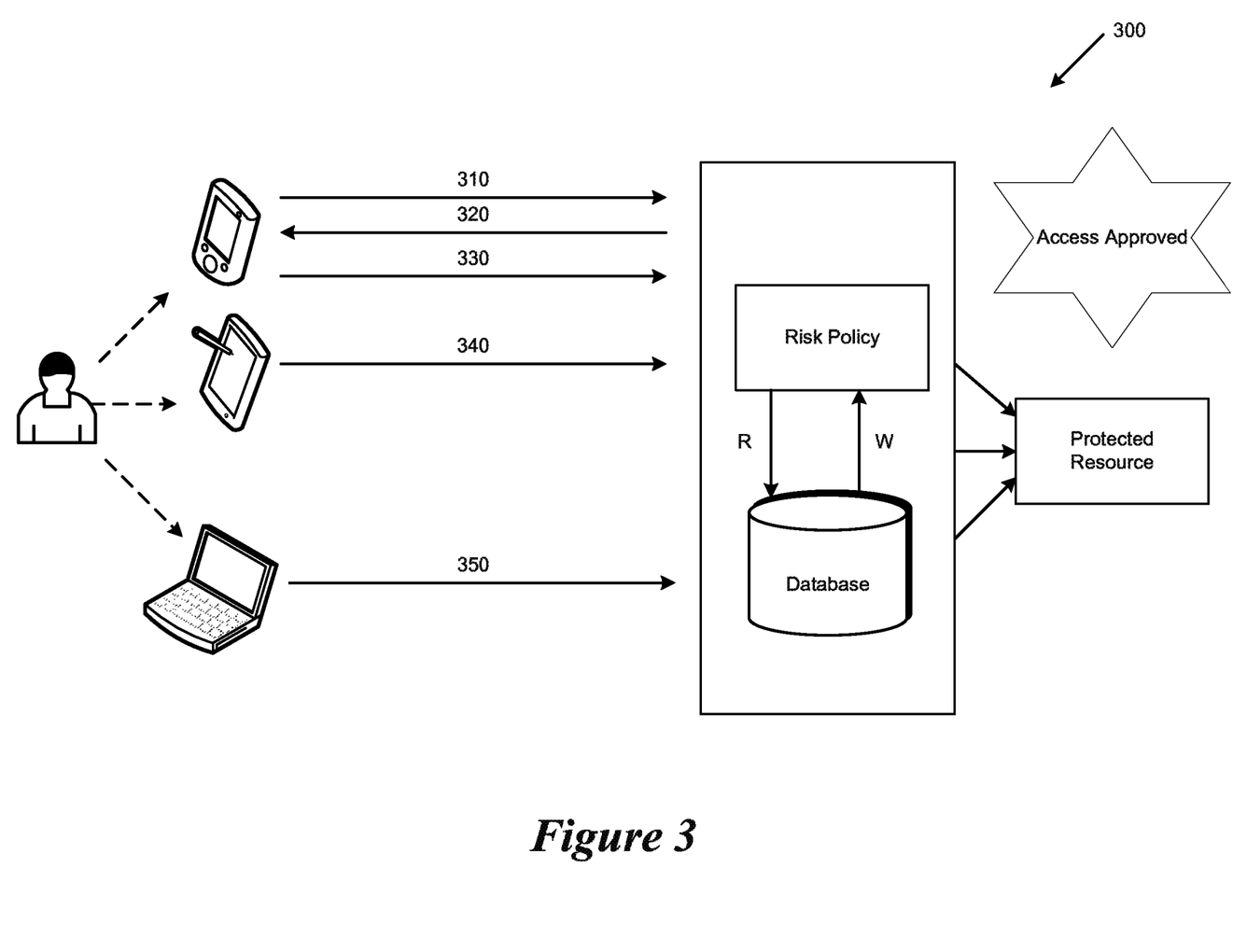
FIG. 3 shows a block diagram of an adaptive security operation within an adaptive security environment.

FIG. 3 shows a block diagram of an adaptive security operation 300 within an adaptive security environment. More specifically the operation 300 shows an adaptive security environment where a single user has a plurality of associated devices. In this example, the policy allows access to the protected resource if the user completes an obligation once using one device. More specifically, the operation starts at step 310 with the user accesses the protected resource (e.g., an enterprise application) using a particular device (device A). Next, at step 320, the user is instructed by the adaptive security system to complete the required obligation (e.g., a second factor authentication). The risk policy is configured such that if the user completes the obligation using any one of their associated devices, the user can then access the protected resource via others of the user's associated devices. Next, at step 330, the user completes the obligation via the first device (device A) and is able to access the protected resource via this device. The policy is updated to indicate that the obligation has been completed. Next, at step 340, the user attempts to access the protected resource via another of their associated devices (i.e., a second associated device (device B)). The risk policy accesses the database to determine whether the obligation has been completed. The risk policy concludes that the user has previously completed the required obligation and the user is allowed to access the protected resource via the second device. Next, at step 350, the user attempts to access the protected resource via yet another of their associated devices (i.e., a third associated device (device C)). The risk policy accesses the database to determine whether the obligation has been completed. The risk policy concludes that the user has previously completed the required obligation and the user is allowed to access the protected resource via the third device.

In certain embodiments, the policy might be extended to verify certain attributes during the adaptive security operation 300. For example, a common set of attributes for the devices might be required. If there is a difference in the values of the attributes, then the risk policy might trigger an obligation for the other devices accessing the protected resource. For example, the policy might only apply if the geographic location of the devices is the same.

In certain embodiments, the policy might be extended to verify certain attributes during the adaptive security operation 300. For example, a common set of attributes for the devices might be required. If there is a difference in the values of the attributes, then the risk policy might trigger an obligation for the other devices accessing the protected resource. For example, the policy might only apply if the geographic location of the devices is the same.

Figure 4:
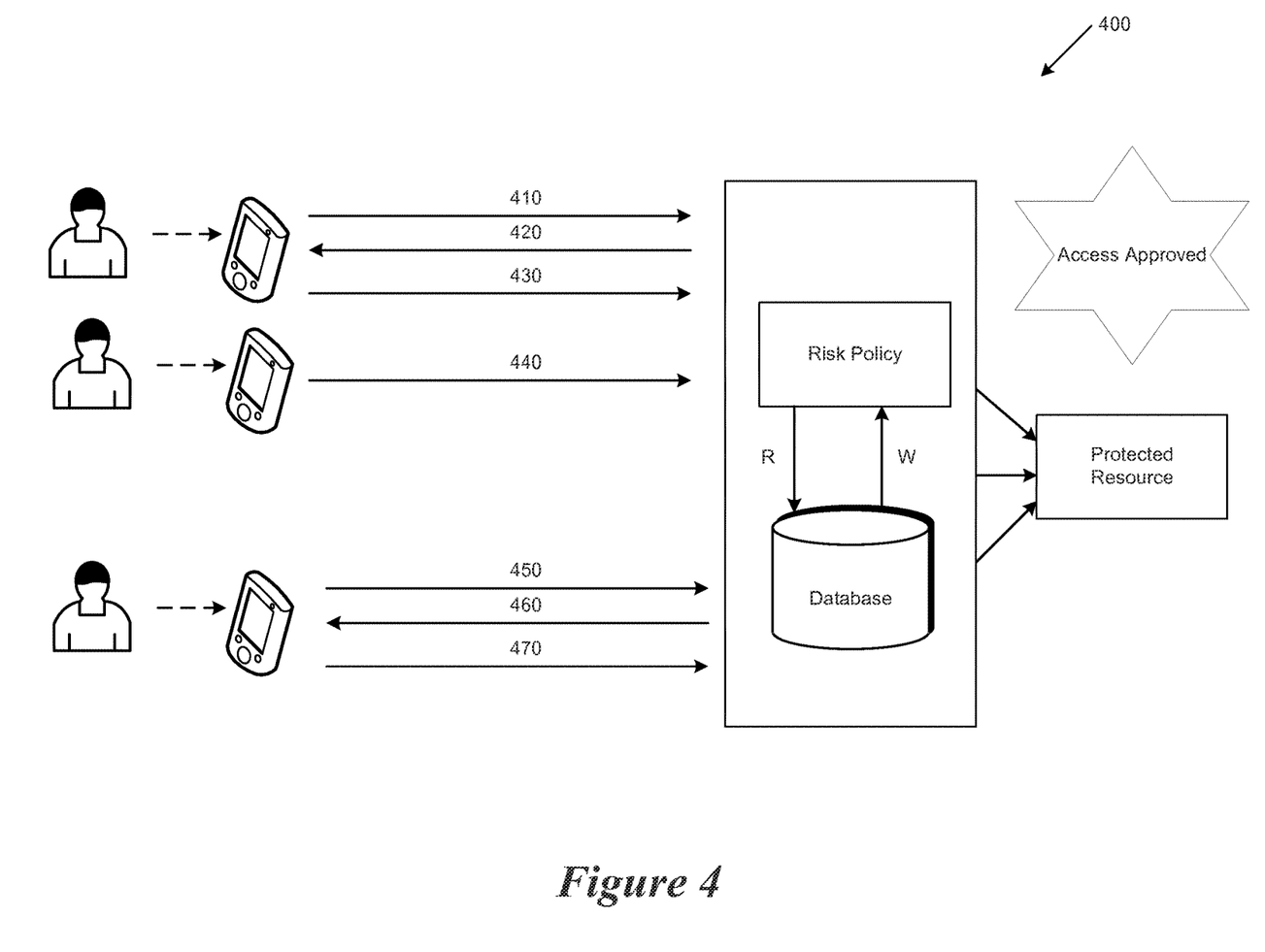
FIG. 4 shows a block diagram of another adaptive security operation within an adaptive security environment.

FIG. 4 shows a block diagram of another adaptive security operation within an adaptive security environment. More specifically, the operation 400 shows an adaptive security environment where a plurality of users have a respective associated device. In this example, the policy allows devices belonging to a federation to access a protected resource provided one user of the federation has completed an obligation using their associated device. More specifically, the operation starts at step 410 with a first user (User A) accesses the protected resource (e.g., an enterprise application) using their device (device A). Next, at step 420, the user is instructed by the adaptive security system to complete the required obligation (e.g., a second factor authentication). The risk policy is configured such that if the user completes the obligation using their associated device, other users belonging to the same federation can then access the protected resource via the other user's associated device. Next, at step 430, the user completes the obligation via the first device (device A) and is able to access the protected resource via this device. The policy is updated to indicate that the obligation has been completed. Next, at step 440, another user (User B) attempts to access the protected resource via their associated device (device B). The risk policy accesses the database to determine whether the obligation has been completed by a user within the federation. The risk policy concludes that the obligation has previously been completed and any users within the federation is allowed to access the protected resource.

Next, at step 450, another user (User C) attempts to access the protected resource via their associated device. In this example, the third user is not a part of the federation. The risk policy accesses the database to determine whether the obligation has been completed. The risk policy concludes that this user is not part of a federation that has previously completed the required obligation. Thus, at step 460, the third user is instructed by the adaptive security system to complete the required obligation (e.g., a second factor authentication). Next at step 470, if the third user completes the required obligation, the user is provided access to the protected resource. If the third user attempts to access the protected resource, the previously completed obligation is sufficient to allow this user to access the resource.

Figure 5:
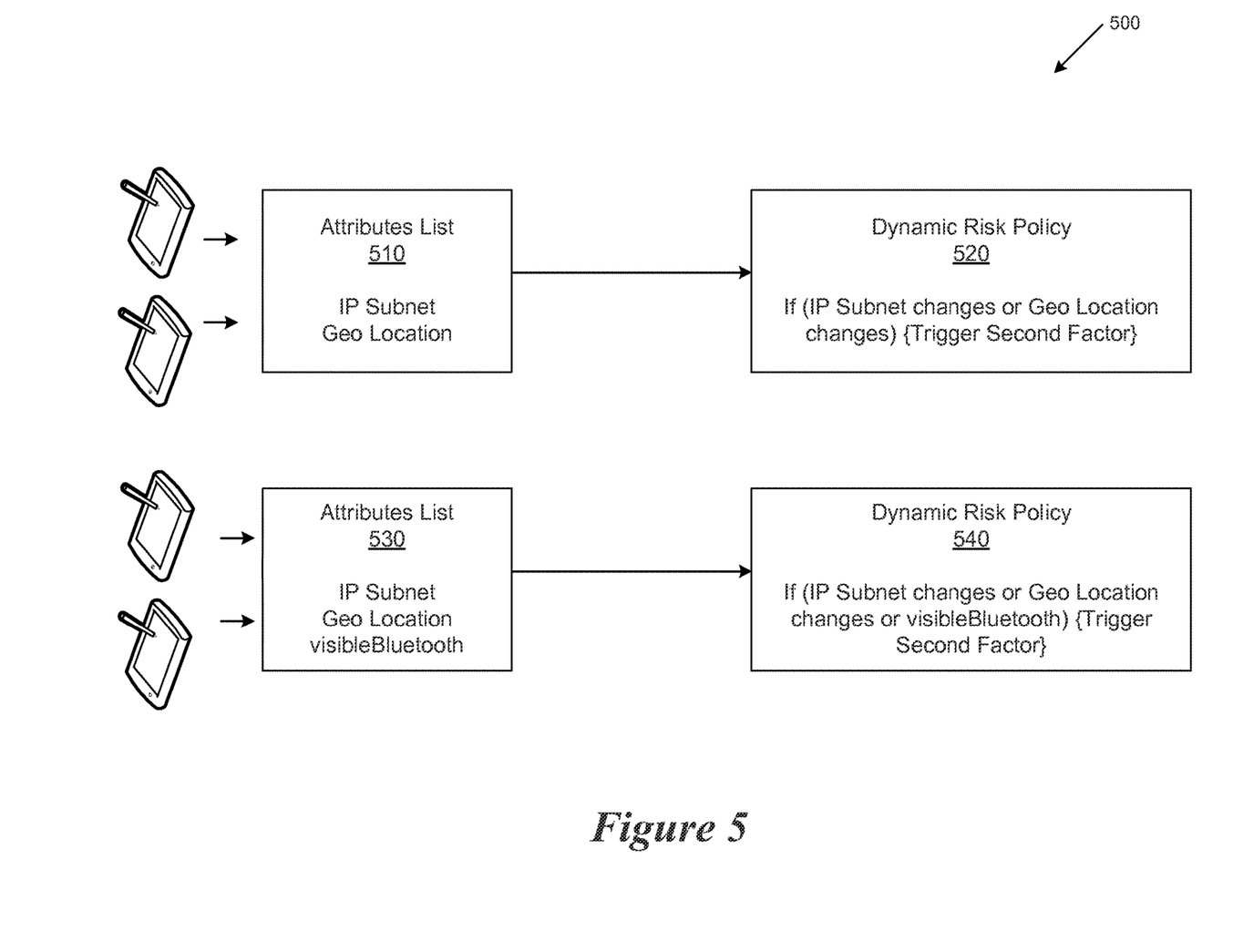
FIG. 5 shows a block diagram of integration between attribute collection and dynamic risk policy within an adaptive security environment.

FIG. 5 shows a block diagram of integration between attribute collection and dynamic risk policy within an adaptive security environment. In certain embodiments, an attributes list 510 and an associated risk policy 520 can be extended dynamically. When dynamically extending the common attributes list, devices supply additional attributes during registration of the devices and access to the protected resource. If the values of one or more additional attributes are the same across devices, then these attributes can be added to the common attributes list. For example, a particular IP subnet address and/or particular geographic location are initially used as the common attributes for a particular federation. Over time, the adaptive security system 230 identifies a pattern where the devices have the same identified Bluetooth type devices in proximity with the user devices 204. The Bluetooth information from the devices is captured this Bluetooth information is then added to the common attribute list 530 in addition of the particular IP subnet address and particular geographic location. Additionally, the risk policy 540 is then modified to reflect that a change in the Bluetooth information can result in triggering a request for a second factor authentication.

Although the present invention has been described in detail, it should be understood that various changes, substitutions and alterations can be made hereto without departing from the spirit and scope of the invention as defined by the appended claims.

What is claimed is:

1. A computer-implemented method for performing an adaptive security operation comprising:
performing an authentication operation via a first device, the authentication operation analyzing an obligation performed by a first user, the obligation comprising a two factor authentication;
establishing access to a protected resource by the first device based upon the obligation performed by the first user;
generating an attribute list comprising at least one attribute of the first device, the at least one attribute enabling identification of similar devices from a usage perspective;
analyzing a second device to determine whether the second device comprises an attribute corresponding to the at least one attribute of the first device, the attribute corresponding to the at least one attribute of the first device indicating that the second device is similar to the first device from a usage perspective, the attribute list being dynamically extended when an attribute is the same across the first and second devices, the attribute being the same across the first and second devices indicating a common pattern across the first and second devices, the common pattern representing a similarity of the first and second devices from a usage perspective;
allowing access to the protected resource by the second device when the second device comprises the attribute corresponding to the at least one attribute of the first device; and,
requiring another two factor authentication based upon a dynamic risk policy, the another two factor authentication being performed before allowing the second device access to the protected resource when the second device does not comprise the attribute corresponding to the at least one attribute of the first device, the second device corresponding to a subset of devices; and wherein when the first and second devices no longer have the common pattern, a corresponding attribute is removed from the attribute list.

2. The method of claim 1, further comprising:
calculating a risk score based on the first device and the second device belonging to the user, the risk score being applied when determining whether the another two factor authentication should be triggered for the second device.

3. The method of claim 1, further comprising:
receiving a request for access to the protected resource from the first user via a third device;
determining whether the first and third devices are associated with the first user; and,
allowing access to the protected resource by the third device when the third device is associated with the first user.

4. The method of claim 1, wherein:
the second device is associated with a second user; and further comprising
determining whether the first device and second device correspond to a federation; and,
allowing the second user access to the protected resource when the first device and the second device correspond to the federation.

5. The method of claim 4, wherein:
the first user and the second user are included within a set of users, each of the set of users having a respective one of a first set of devices; and further comprising:
performing an authentication process is performed on a first set of users each using a respective one of the first set of devices for a protected resource, wherein the authentication process determines whether a first factor is present;
receiving a request for access to the protected resource from a subset of the first set of users in a new user context;
evaluating the new user context according a security policy based upon the first factor;
requesting a subset of the set of users to input another two factor authentication via respective devices of the first set of devices; and
once a subset of users passes a threshold, allowing access to the network resource to other users belonging to the first set of users without requiring input of the another two factor authentication.

6. The method of claim 1, wherein:
the attribute list reflects a user context; and,
the user context includes an internet protocol (IP) subnet address and geographic location.

7. A system comprising:
a processor;
a data bus coupled to the processor; and
a tangible computer-usable medium embodying computer program code, the computer-usable medium being coupled to the data bus, the computer program code used for performing an adaptive security operation and comprising instructions executable by the processor and configured for:
performing an authentication operation via a first device, the authentication operation analyzing an obligation performed by a first user, the obligation comprising a two factor authentication;

establishing access to a protected resource by the first device based upon the obligation performed by the first user;

generating an attribute list comprising at least one attribute of the first device, the at least one attribute enabling identification of similar devices from a usage perspective;

analyzing a second device to determine whether the second device comprises an attribute corresponding to the at least one attribute of the first device, the attribute corresponding to the at least one attribute of the first device indicating that the second device is similar to the first device from a usage perspective, the attribute list being dynamically extended when an attribute is the same across the first and second devices, the attribute being the same across the first and second devices indicating a common pattern across the first and second devices, the common pattern representing a similarity of the first and second devices from a usage perspective;

allowing access to the protected resource by the second device when the second device comprises the attribute corresponding to the at least one attribute of the first device; and, requiring another two factor authentication based upon a dynamic risk policy, the another two factor authentication being performed before allowing the second device access to the protected resource when the second device does not comprise the attribute corresponding to the at least one attribute of the first device, the second device corresponding to a subset of devices; and wherein when the first and second devices no longer have the common pattern, a corresponding attribute is removed from the attribute list.

8. The system of claim 7, wherein the instructions executable by the processor are further configured for:

calculating a risk score based on the first device and the second device belonging to the user, the risk score being applied when determining whether the another two factor authentication should be triggered for the second device.

9. The system of claim 7, wherein the instructions executable by the processor are further configured for:

receiving a request for access to the protected resource from the first user via a third device;

determining whether the first and third devices are associated with the first user; and, allowing access to the protected resource by the third device when the third device is associated with the first user.

10. The system of claim 7, wherein:

the second device is associated with a second user; and the instructions executable by the processor are further configured for:

determining whether the first device and second device correspond to a federation; and, allowing the second user access to the protected resource when the first device and the second device correspond to the federation.

11. The system of claim 10, wherein:

the first user and the second user are included within a set of users, each of the set of users having a respective one of a first set of devices; and the instructions executable by the processor are further configured for:

performing an authentication process is performed on a first set of users each using a respective one of the first set of devices for a protected resource, wherein the authentication process determines whether a first factor is present;

receiving a request for access to the protected resource from a subset of the first set of users in a new user context;

evaluating the new user context according a security policy based upon the first factor;

requesting a subset of the set of users to input another two factor authentication via respective devices of the first set of devices; and once a subset of users passes a threshold, allowing access to the network resource to other users belonging to the first set of users without requiring input of the another two factor authentication.

12. The system of claim 7, wherein:

the attribute list reflects a user context; and, the user context includes an internet protocol (IP) subnet address and geographic location.

13. A non-transitory, computer-readable storage medium embodying computer program code, the computer program code comprising computer executable instructions configured for:

performing an authentication operation via a first device, the authentication operation analyzing an obligation performed by a first user, the obligation comprising a two factor authentication;

establishing access to a protected resource by the first device based upon the obligation performed by the first user;

generating an attribute list comprising at least one attribute of the first device, the at least one attribute enabling identification of similar devices from a usage perspective;

analyzing a second device to determine whether the second device comprises an attribute corresponding to the at least one attribute of the first device, the attribute corresponding to the at least one attribute of the first device indicating that the second device is similar to the first device from a usage perspective, the attribute list being dynamically extended when an attribute is the same across the first and second devices, the attribute being the same across the first and second devices indicating a common pattern across the first and second devices, the common pattern representing a similarity of the first and second devices from a usage perspective;

allowing access to the protected resource by the second device when the second device comprises the attribute corresponding to the at least one attribute of the first device; and, requiring another two factor authentication based upon a dynamic risk policy, the another two factor authentication being performed before allowing the second device access to the protected resource when the second device does not comprise the attribute corresponding to the at least one attribute of the first device, the second device corresponding to a subset of devices; and wherein when the first and second devices no longer have the common pattern, a corresponding attribute is removed from the attribute list.

14. A non-transitory, computer-readable storage medium of claim 13, wherein the computer executable instructions are further configured for:

calculating a risk score based on the first device and the second device belonging to the user, the risk score being applied when determining whether the another two factor authentication should be triggered for the second device.

15. A non-transitory, computer-readable storage medium of claim 13, wherein the computer executable instructions are further configured for:
receiving a request for access to the protected resource from the first user via a third device;
determining whether the first and third devices are associated with the first user; and,
allowing access to the protected resource by the third device when the third device is associated with the first user.

16. A non-transitory, computer-readable storage medium of claim 13, wherein:
the second device is associated with a second user; and
determining whether the first device and second device correspond to a federation; and,
allowing the second user access to the protected resource when the first device and the second device correspond to the federation.

17. A non-transitory, computer-readable storage medium of claim 16, wherein:
the first user and the second user are included within a set of users, each of the set of users having a respective one of a first set of devices; and the computer executable instructions are further configured for:
performing an authentication process is performed on a first set of users each using a respective one of the first set of devices for a protected resource, wherein the authentication process determines whether a first factor is present;
receiving a request for access to the protected resource from a subset of the first set of users in a new user context;
evaluating the new user context according a security policy based upon the first factor;
requesting a subset of the set of users to input another two factor authentication via respective devices of the first set of devices; and
once a subset of users passes a threshold, allowing access to the network resource to other users belonging to the first set of users without requiring input of the another two factor authentication.

18. A non-transitory, computer-readable storage medium of claim 13, wherein:
the attribute list reflects a user context; and,
the user context includes an internet protocol (IP) subnet address and geographic location.

19. A non-transitory, computer-readable storage medium of claim 13, wherein the computer executable instructions are deployable to a client system from a server system at a remote location.

20. A non-transitory, computer-readable storage medium of claim 13, wherein the computer executable instructions are provided by a service provider to a user on an on-demand basis.

* * * * *

UNITED STATES PATENT AND TRADEMARK OFFICE
CERTIFICATE OF CORRECTION

Page 1 of 1

PATENT NO. : 10,681,031 B2
APPLICATION NO. : 14/930010
DATED : June 9, 2020
INVENTOR(S) : Codur Sreedhar Pranam and Patrick R. Wardrop It is certified that error appears in the above-identified patent and that said Letters Patent is hereby corrected as shown below:

On the Title Page

Item (72), The first inventor's name should read "Codur Sreedhar Pranam"

Signed and Sealed this
Seventeenth Day of November, 2020

Andrei Iancu
*Director of the United States Patent and Trademark Office*